(12) United States Patent
Lee (10) Patent No.: US 8,401,235 B2
(45) Date of Patent: Mar. 19, 2013

(54) METHOD AND SYSTEM FOR RECOGNIZING PARKING LOT

(75) Inventor: Yun Hee Lee, Hwaseong-si (KR)

(73) Assignee: Mando Corporation, Gyeonggi-do (KR)

(*) Notice: Subject to any disclaimer, the term of this patent is extended or adjusted under 35 U.S.C. 154(b) by 321 days.

(21) Appl. No.: 12/938,752

(22) Filed: Nov. 3, 2010

(65) Prior Publication Data
US 2011/0116717 A1 May 19, 2011

(30) Foreign Application Priority Data
Nov. 17, 2009 (KR) .................. 10-2009-0110689

(51) Int. Cl.
*G06K 9/00* (2006.01)
(52) U.S. Cl. ........ 382/104; 382/199; 382/106; 340/435; 340/436
(58) Field of Classification Search .................. None
See application file for complete search history.

(56) References Cited

U.S. PATENT DOCUMENTS
6,990,216 B2* 1/2006 Yamamura ............... 382/106
2002/0044048 A1* 4/2002 Watanabe et al. ......... 340/436

FOREIGN PATENT DOCUMENTS
EP 2093129 A2 * 8/2009

OTHER PUBLICATIONS

Ho Gi Jung, Young Ha Cho, Pal Joo Yoon, and Jaihie Kim, "Scanning Laser Radar-Based Target Position Designation for Parking Aid System", Sep. 2008, IEEE Transactions on Intelligent Transporation Systems, vol. 9, No. 3, pp. 406-424.*
Ho Gi Jung, Dong Suk Kim, Pal Joo Yoon, and Jaihie Kim, "Parking Slot Markings Recognition for Automatic Parking Assist System", Jun. 13-15, 2006, Intelligent Vehicles Symposium, pp. 106-113.*

* cited by examiner

*Primary Examiner* — Andrew W Johns
*Assistant Examiner* — Siamak Harandi
(74) *Attorney, Agent, or Firm* — McDermott Will & Emery LLP (57) ABSTRACT

Disclosed are a parking space recognition method and apparatus. The inventive parking space recognition system includes: a vehicle edge extraction unit for extracting a vehicle edge of a counterpart vehicle positioned adjacent to a parking space by analyzing an image acquired by a camera; a vehicle position extraction unit for extracting a vehicle position of the counterpart vehicle by analyzing ultrasonic wave data acquired by an ultrasonic sensor; a vehicle edge position analysis unit for analyzing the vehicle edge position for the extracted vehicle edge by mapping the extracted vehicle edge and the extracted vehicle position; and a parking space recognition unit for recognizing the parking space by determining the position of the counterpart vehicle on the basis of the analyzed vehicle edge position. According to the present invention, a sensor convergence type parking space recognition technology using a camera and an ultrasonic sensor in such a manner that the disadvantages of the ultrasonic sensor and the camera can be compensated with each other.

8 Claims, 11 Drawing Sheets

| -1 | 0 | 1 |
|---|---|---|
| -2 | 0 | 2 |
| -1 | 0 | 1 |

METHOD AND SYSTEM FOR RECOGNIZING PARKING LOT

CROSS-REFERENCE TO RELATED APPLICATION

This application claims priority from and the benefit of Korean Patent Application No. 10-2009-0110689, filed on Nov. 17, 2009, which is hereby incorporated by reference for all purposes as if fully set forth herein.

BACKGROUND OF THE INVENTION

1. Field of the Invention

The present invention relates to a method and a system for recognizing a parking space, and more particularly to a technique for recognizing a parking space by using a camera and an ultrasonic sensor.

2. Description of the Prior Art

Due to the development of the automotive industry, the number of automobiles has been greatly increased and automotive technologies have been vigorously developed. In particular, due to the development of electronic technologies, numerous researches have been made in terms of intelligent automotive technologies. Among them, driver assistance systems (DASs) have been greatly improved in terms of technical advances, which have been applied to intelligent automobiles.

Among the driver assistance systems, parking assistance systems have been also actively researched in the intelligent automotive field, and have been practically applied to automobiles. Such parking assistance systems are used for aiding a driver to park an automobile.

Such a parking assistance system may be divided into a parking space recognition unit, a parking track generation unit, and a steering control unit. In addition, the parking space recognition unit may be divided into a parallel parking space recognition unit and a perpendicular parking space recognition unit. Parking space recognition may be performed, using ultrasonic waves, a rear-view camera, or a laser scanner.

Among the conventional parking space recognition methods, a parking space recognition method using ultrasonic waves has a problem in that a parking space cannot be precisely recognized since an edge of a counterpart vehicle adjacent to a parking space desired for parking a vehicle cannot be precisely extracted due to the limitation in terms of distance and resolution of ultrasonic waves. A conventional parking space recognition method using a camera has a problem in that a parking space cannot be precisely recognized since the position of a counterpart vehicle cannot be precisely recognized by determining the distance to the counterpart vehicle.

That is, the conventional parking space recognition methods using either an ultrasonic sensor or a camera for recognizing a parking space have a problem in that they cannot precisely recognize a parking space due to the disadvantages of the ultrasonic sensor and the camera, respectively.

SUMMARY OF THE INVENTION

Accordingly, the present invention has been made to solve the above-mentioned problems occurring in the prior art, and an object of the present invention is to provide a sensor convergence type parking space recognition technology using a camera and an ultrasonic sensor in such a manner that the disadvantages of the ultrasonic sensor and the camera can be compensated with each other.

In order to accomplish this object, there is provided a parking space recognition system including: a vehicle edge extraction unit for extracting an edge of a counterpart vehicle positioned adjacent to a parking space by analyzing an image acquired by a camera; a vehicle position extraction unit for extracting the position of the counterpart vehicle by analyzing ultrasonic wave data acquired by an ultrasonic sensor; a vehicle edge position analysis unit for analyzing the vehicle edge position for the extracted vehicle edge by mapping the extracted vehicle edge and the extracted vehicle position; and a parking space recognition unit for recognizing the parking space by determining the position of the counterpart vehicle on the basis of the analyzed vehicle edge position.

In accordance with another aspect of the present invention, there is provided a parking space recognition method including the steps of: extracting an edge of a counterpart vehicle positioned adjacent to a parking space by analyzing an image acquired by a camera; extracting the position of the counterpart vehicle by analyzing ultrasonic wave data acquired by an ultrasonic sensor; analyzing the vehicle edge position for the extracted vehicle edge by mapping the extracted vehicle edge and the extracted vehicle position; and recognizing the parking space by determining the position of the counterpart vehicle on the basis of the analyzed vehicle edge position.

According to the present invention, there is provided a sensor convergence type parking space recognition technology using a camera and an ultrasonic sensor in such a manner that the disadvantages of the ultrasonic sensor and the camera can be compensated with each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description and drawings, it shall be noted that the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
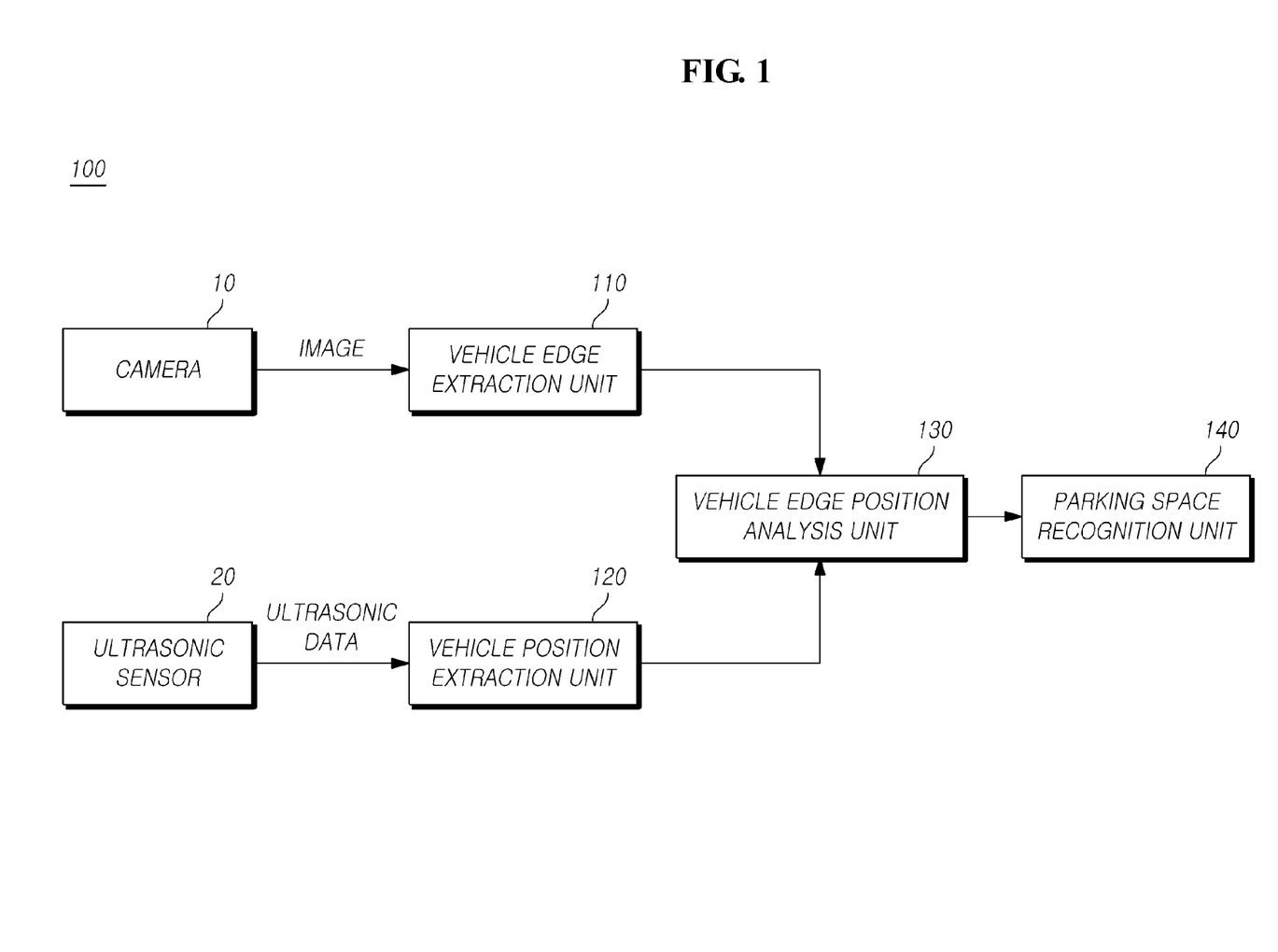
FIG. 1 is a block diagram of a parking space recognition system in accordance with an embodiment of the present invention.

FIG. 1 is a block diagram of a parking space recognition system 100 in accordance with an embodiment of the present invention.

Referring to FIG. 1, the parking space recognition system 100 includes a vehicle edge extraction unit 110 for extracting an edge (which may be also referred to as "corner") of a counterpart vehicle positioned adjacent to a parking space (for example, a public parking lot, an ordinary apartment parking lot or the like) by analyzing an image acquired by a camera 10; a vehicle position extraction unit 120 for extracting the position of the counterpart vehicle by analyzing ultrasonic wave data acquired by an ultrasonic sensor 20; a vehicle edge position analysis unit 130 for analyzing the vehicle edge position for the extracted vehicle edge by mapping the vehicle edge extracted by the vehicle edge extraction unit 110 and the vehicle position extracted by the vehicle position extraction unit 120; and a parking space recognition unit 140 for recognizing the parking space by determining the position of the counterpart vehicle on the basis of the vehicle edge position analyzed by the vehicle edge position analysis unit 130.

A parking space recognition method provided by the above-mentioned parking space recognition system 100 in accordance with an embodiment of the present invention will be described briefly again with reference to FIG. 2. The parking space recognition system 100 receives an image 210 and ultrasonic data 220 from the camera 10 and the ultrasonic sensor 20, respectively, wherein the camera 10 and the ultrasonic sensor 10 are mounted at predetermined positions on a vehicle equipped with the parking space recognition system (hereinafter, this vehicle may be referred to as a "parking space recognition system equipped vehicle for the convenience of description). The parking space recognition system 100 analyzes the received image 210, thereby extracting a vehicle edge of a counterpart vehicle parked adjacent to a parking space, and analyzes the received ultrasonic data 220, thereby extracting a vehicle position for the counterpart vehicle. Thereafter, the parking space recognition system 100 analyzes the position of the vehicle edge by mapping the vehicle edge and the vehicle position of the counterpart vehicle using the inputted image, and recognizes the parking space on the basis of the position of the vehicle edge. As a result, the parking space recognition system can obtain parking space recognition result data 230.

In order to extract the vehicle edge of the counterpart vehicle, the vehicle edge extraction unit 110 firstly extracts longitudinal edges from the image 210 input from the camera 10. The width of the counterpart vehicle can be determined on the basis of a transverse edge of the counterpart vehicle. However, since the counterpart vehicle may not appear entirely in the obtained image 210, it is difficult to determine the precise position of the counterpart vehicle on the basis of the transverse edge. For this reason and due to the fact that the vehicle edge of the counterpart vehicle is mainly a longitudinal edge, the vehicle edge of the counterpart vehicle is extracted on the basis of longitudinal edges, and the position of the vehicle edge is determined on the basis of the extracted vehicle edge.

Figure 3:
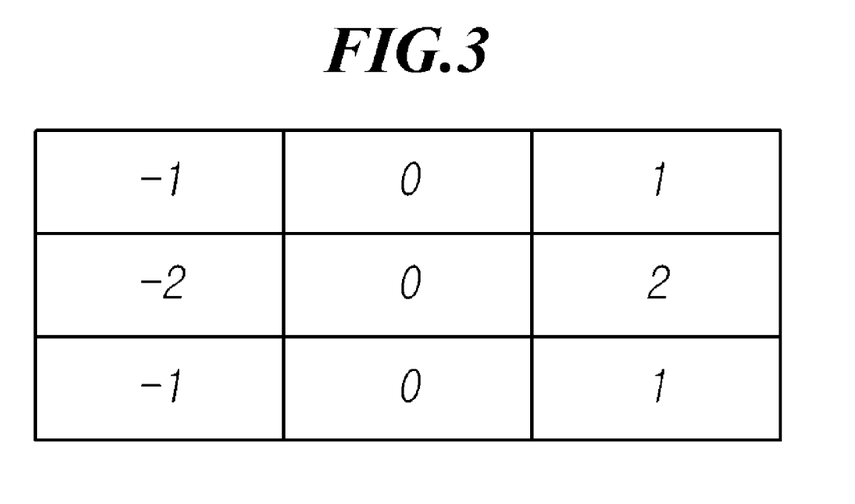
FIG. 3 shows a sobel mask in a sobel edge extraction method for use in extracting an edge of a counterpart vehicle by a vehicle edge extraction unit included in the inventive parking space recognition system.

The vehicle edge extraction unit 110 is capable of extracting a vehicle edge of the counterpart vehicle from the image acquired by the camera, by using a proper edge extraction method, such as a sobel edge extraction method. The sobel edge extraction method uses a sobel mask as exemplified in FIG. 3, and shows a characteristic which is relatively more robust than other edge extraction methods in relation to noise.

Figure 4:
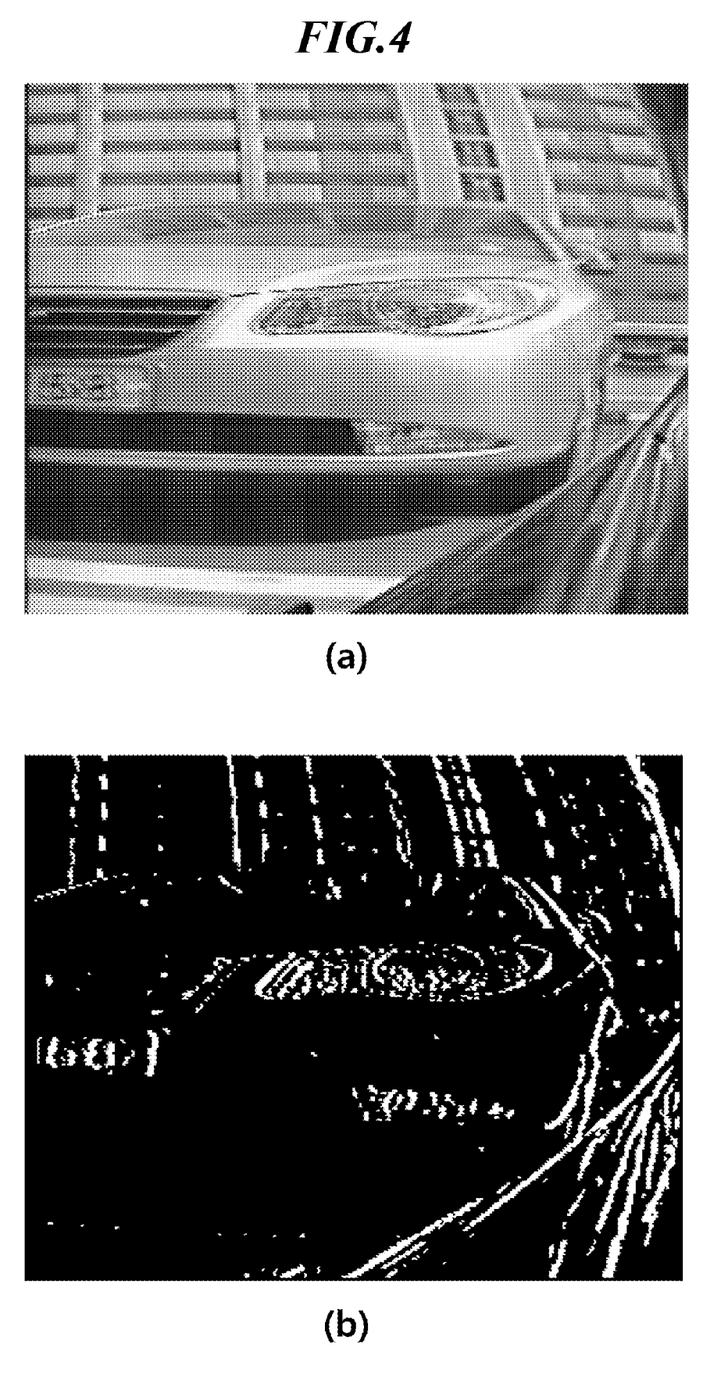
FIGS. 4a and 4b show an image input to a vehicle edge extraction unit included in the inventive parking space recognition system, and longitudinal edges extracted by such a vehicle edge extraction unit, respectively.

FIGS. 4a and 4b show an image 210 input to the vehicle edge extraction unit 110 included in the inventive parking space recognition system 100 and longitudinal edges extracted using the sobel edge extraction method, respectively.

In order to extract the vehicle edge of the counterpart vehicle as shown in FIG. 4b from the image 210 as shown in FIG. 4a through the sobel edge extraction method, it is necessary to extract the vehicle edge of the counterpart vehicle from the longitudinal edges extracted from the image 210. However, a lot of noise components may exist in the extracted longitudinal edges. In particular, a lot of longitudinal edges of an apartment positioned away from the counterpart vehicle may be included in the extracted result as shown in FIG. 4b, wherein the edges of the apartment are noises. Therefore, in order to remove the noises which interrupt the extraction of the vehicle edge of the counterpart vehicle from the longitudinal edges, the vehicle edge extraction unit 110 extracts a distance image using stereo matching, and removes the noises from the distance image.

Typically two cameras are used in stereo matching for acquiring a distance image. However, the present invention may use only one camera 10. If one camera 10 is used for stereo matching, stereo matching can be executed using the movement of the parking space recognition system equipped vehicle. In addition, the stereo matching is executed on the basis of extracted longitudinal edges, and performed only for a part with a large longitudinal edge. As a result, there is an advantage in that it is possible to substantially reduce the amount of computation as compared to the case in which matching is performed for the entire area.

The vehicle edge extraction unit 110, which extracts the correct vehicle edge of the counterpart by removing noises through the above-mentioned stereo matching, extracts the vehicle edge of the counterpart vehicle firstly by extracting longitudinal edges from the image 210, and then removing edges corresponding to noises from the extracted longitudinal edges on the basis of edge information and color information through stereo matching using the vehicle's movement information obtained from one or more sensors (e.g., a vehicle speed sensor, a steering angle sensor or the like).

The above-mentioned vehicle's movement information may include at least one of speed information and steering information of the parking space recognition system equipped vehicle.

Figure 5:
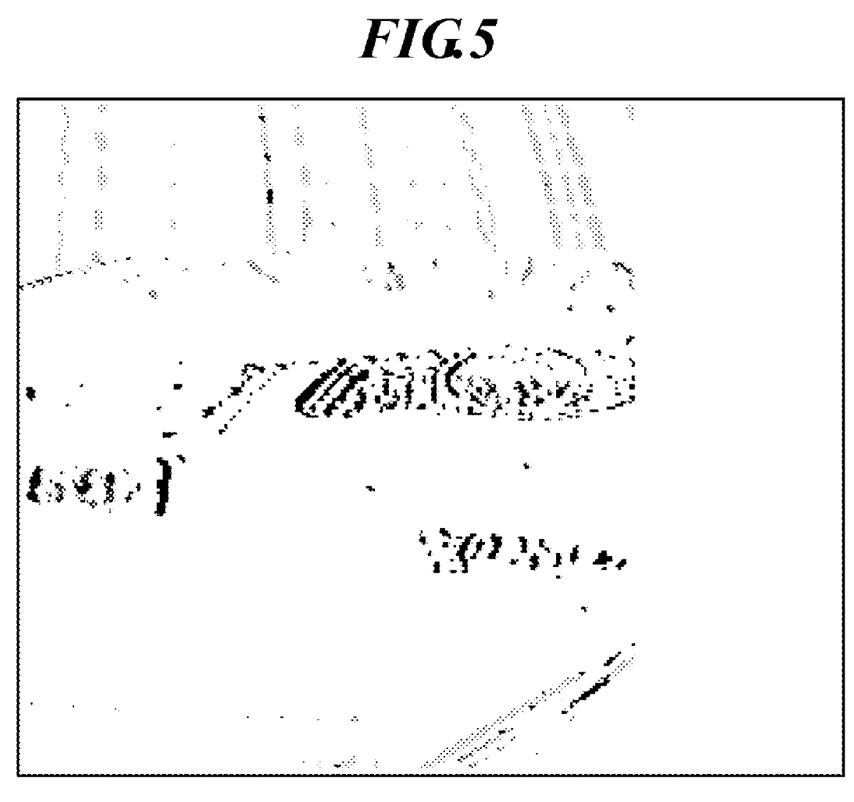
FIG. 5 shows a vehicle edge of a counterpart vehicle obtained by removing noises through stereo matching in a vehicle edge extraction unit included in the inventive parking space recognition system.

Extraction of the vehicle edge of the counterpart vehicle using the above-mentioned stereo matching will be described with reference to Equation 1, Equation 2 and Equation 3, which are set forth below, and FIG. 5 which exemplifies an extraction result of a vehicle edge of a counterpart vehicle.

The stereo matching is executed for a part which has the largest similarity S, using the edge information and the color information for the extracted longitudinal edges. Similarities may be calculated through Equation 1, Equation 2 and Equation 3 set forth below. In Equation 1, $S_{class}$ means similarity according to edge information, f(a, b) is a function indicating whether an edge exists or not, and the term a and the term b in f(a, b) mean left image data and right image data, respectively. In Equation 2, $S_{color}$ means similarity according to color information, $X_{left}$ means the color information of the left image, and $X_{right}$ means the color information of the right image.

$$S_{class}(x, y, s) = \frac{1}{5 \times 5} \sum_{u=-1}^{1} \sum_{v=-1}^{1} f\left(L_{class}(x+u, y+v), R_{class}(x+u+s, y+v)\right)$$

$$f(a, b) = \begin{cases} 0, & a = b \\ 1, & a \neq b \end{cases}$$

Equation 1

$$S_{color}(x, y, s) = 1 - \frac{1}{256} \sqrt{\frac{\sum_{u=-2}^{2} \sum_{v=-2}^{2} \left( X_{left}(x+u, y+v) - X_{right}(x+u+s, y+v) \right)^2}{5 \times 5}}$$

$$X: [R, G, B]$$

Equation 2

$$S(x, y, s) = S_{color}(x, y, s) \times S_{class}(x, y, s)$$

Equation 3

In Equation 3 for obtaining the final similarity by multiplying the similarity of edge information in Equation and the similarity according to color information in Equation 2, the term s, in which the similarity S has the largest value, will be a disparity. Referring to FIG. 5 which exemplifies an extraction result of a vehicle edge of a counterpart vehicle, it will be appreciated that the vehicle edge of the counterpart vehicle, which is nearly positioned, is indicated darkly, and edges, which are positioned far away (for example, edges corresponding to the background, such as an apartment, behind the counterpart vehicle in FIG. 4), are indicated indistinctly. Therefore, it can be appreciated from FIG. 5 that only the vehicle edge of the counterpart vehicle has been extracted after the edges corresponding to noises were removed according to the distances thereof.

Figure 6:
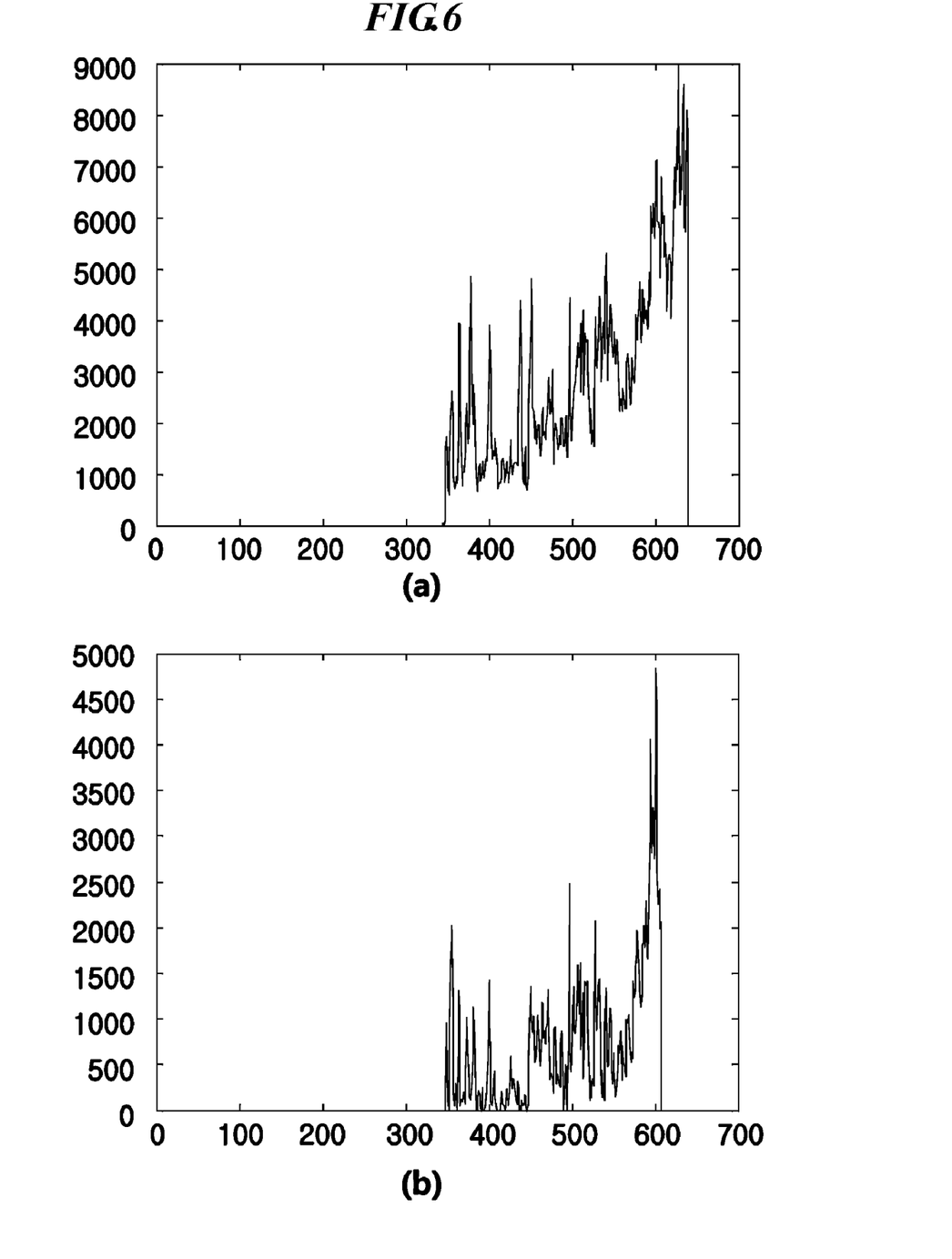
FIGS. 6a and 6b show longitudinal edge sums prior to and after performing stereo matching in a vehicle edge extraction unit included in the inventive parking space recognition system, respectively.

FIGS. 6a and 6b show the longitudinal edge sums prior to and after performing stereo matching in a vehicle edge extraction unit included in the inventive parking space recognition system, respectively.

Prior to performing stereo matching, the maximum value of the longitudinal edges is formed at a place which is not positioned on a vehicle (counterpart vehicle) as shown in FIG. 6a. However, after performing the stereo matching, the maximum value of the longitudinal edges is formed on the place where the vehicle edge of the counterpart vehicle is positioned as shown in FIG. 6b because noises were removed.

The vehicle position extraction unit 120 extracts the vehicle position for the counterpart vehicle through the ultrasonic data input from the ultrasonic sensor 20, wherein the vehicle position extraction unit 120 converts the distance value of the ultrasonic data received at the position of the parking space recognition system equipped vehicle into coordinate values, and extracts the vehicle position of the counterpart vehicle from the converted coordinate values.

As described above, the vehicle position of a counterpart vehicle is extracted by converting the distance value of the ultrasonic data received at the position of the parking space recognition system equipped vehicle into coordinate values. For this purpose, the position of the parking space recognition system equipped vehicle is firstly tracked. The position of the parking space recognition system equipped vehicle can be determined on the basis of the vehicle speed and yaw rate which can be periodically input, wherein the position of the parking space recognition system equipped vehicle is tracked with reference to the moving start point of the vehicle to be parked with the yaw rate and the vehicle speed.

Figure 7:
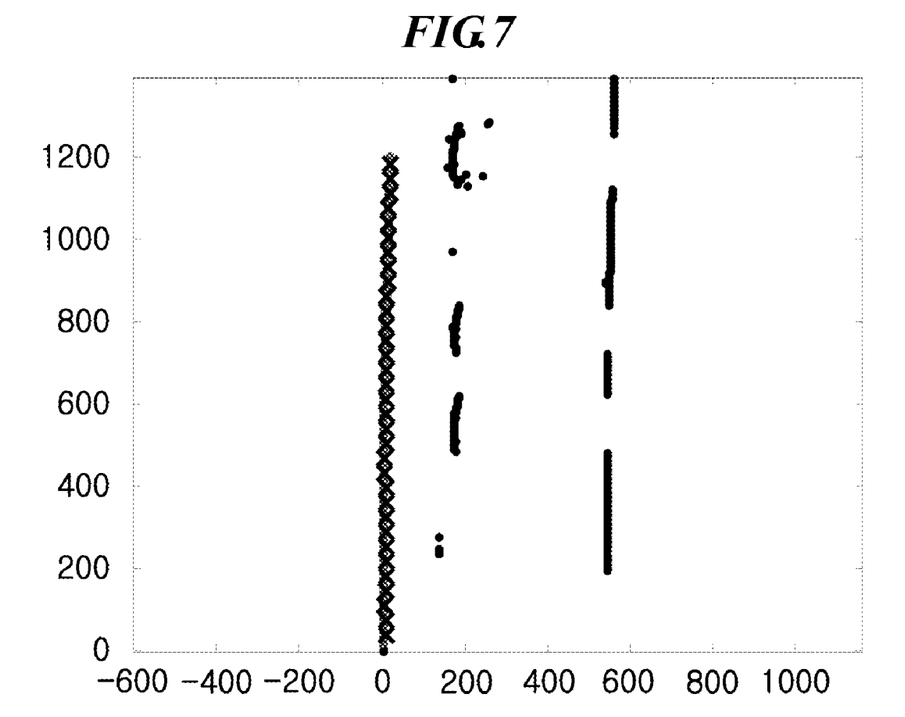
FIG. 7 shows a position of a vehicle equipped with the parking space recognition system, and a position of a counterpart vehicle, wherein the positions are extracted by a vehicle position extraction unit included in the inventive parking space recognition system.

The position of the counterpart vehicle is determined on the basis of ultrasonic data, wherein the position of the counterpart vehicle can be calculated by converting a distance value of ultrasonic data received at a tracked position of the vehicle to be parked into a second-order coordinate. FIG. 7 shows the positions of a parking space recognition system equipped vehicle and a counterpart vehicle. In FIG. 7, x-marked red dots show the movement of the parking space recognition system equipped vehicle, and blue dots indicate acquired ultrasonic data, from which the vehicle position of the counterpart vehicle can be confirmed.

Like this, for a counterpart vehicle positioned adjacent to a parking space where a user's vehicle is to be parked, the vehicle edge extraction unit extracts a vehicle edge of the counterpart vehicle, the vehicle position extraction unit 120 extracts the position of the counterpart vehicle, and then the vehicle edge position analysis unit 130 analyzes the vehicle edge position on the basis of the extracted vehicle edge and vehicle position. The vehicle edge position analysis unit 130 can analyze the vehicle edge position for the extracted vehicle edge by generating an edge peak map consisting of edge peaks from the vehicle edge extracted by the vehicle edge extraction unit 110, extracting a group of position candidates for the extracted vehicle edge from the generated edge peak map, and mapping the position candidates on the same coordinate with the extracted vehicle position.

Figure 8:
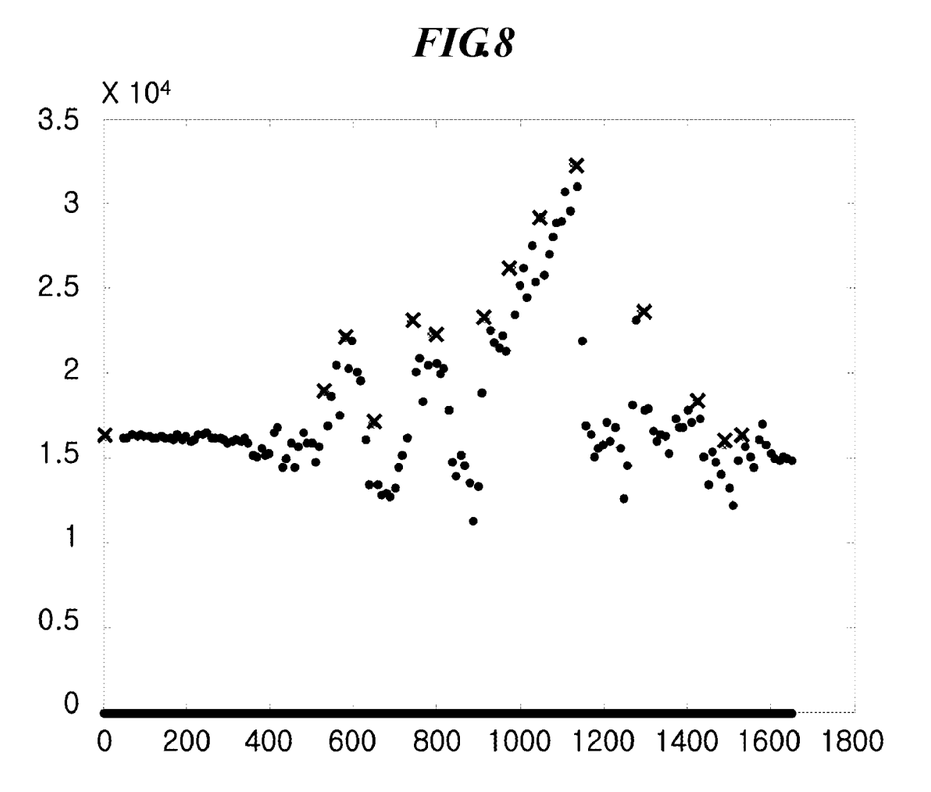
FIG. 8 shows an edge peak map generated by a vehicle edge position analysis unit included in the inventive parking space recognition system.
Figure 9:
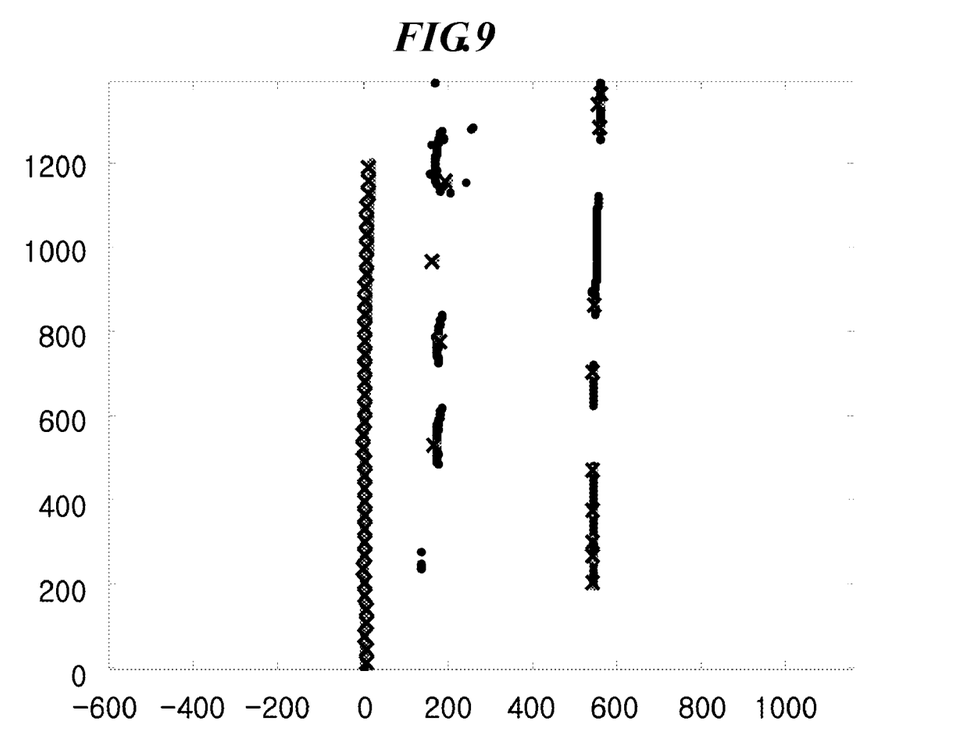
FIG. 9 shows a vehicle edge position and a vehicle position mapped on the same coordinate by a vehicle edge position analysis included in the inventive parking space recognition system.

The above-mentioned vehicle edge position is described in more detail with reference to FIGS. 8 and 9. FIG. 8 shows an edge peak map generated by a vehicle edge position analysis unit included in the inventive parking space recognition system, and FIG. 9 shows a vehicle edge position and a vehicle position mapped on the same coordinate by a vehicle edge position analysis included in the inventive parking space recognition system.

The above-mentioned vehicle edge position analysis of the counterpart vehicle is firstly executed on the basis of an image input through the camera 10. An edge peak map as shown in FIG. 8 is obtained for the entire image sequence using the edge peaks for the longitudinal vehicle edge extracted from the image 210 input through the camera. Referring to FIG. 8, it can be noted that the edge peaks are formed at the position where the vehicle edge of the counterpart vehicle exists. In FIG. 8, x-marked red dots correspond to found local peaks, which form a group of position candidates for the vehicle edge of the counterpart vehicle.

In order to map the position candidates for the vehicle edge of the counterpart vehicle found in this manner with the ultrasonic data 220, the position of the vehicle edge found from the image 210 and the position of the parking space recognition system equipped vehicle are mapped to form the same coordinate. Since the ultrasonic data 220 and the movement of the parking space recognition system equipped vehicle are laid on the same coordinate in the vehicle position extraction result, it is possible to lay the ultrasonic data 220 and the position of the vehicle edge extracted from the image 210 on the same coordinate. FIG. 9 shows a result obtained by mapping a result found from the vehicle edge extracted from the image 210 and the ultrasonic data 220 on the same coordinate.

Figure 10:
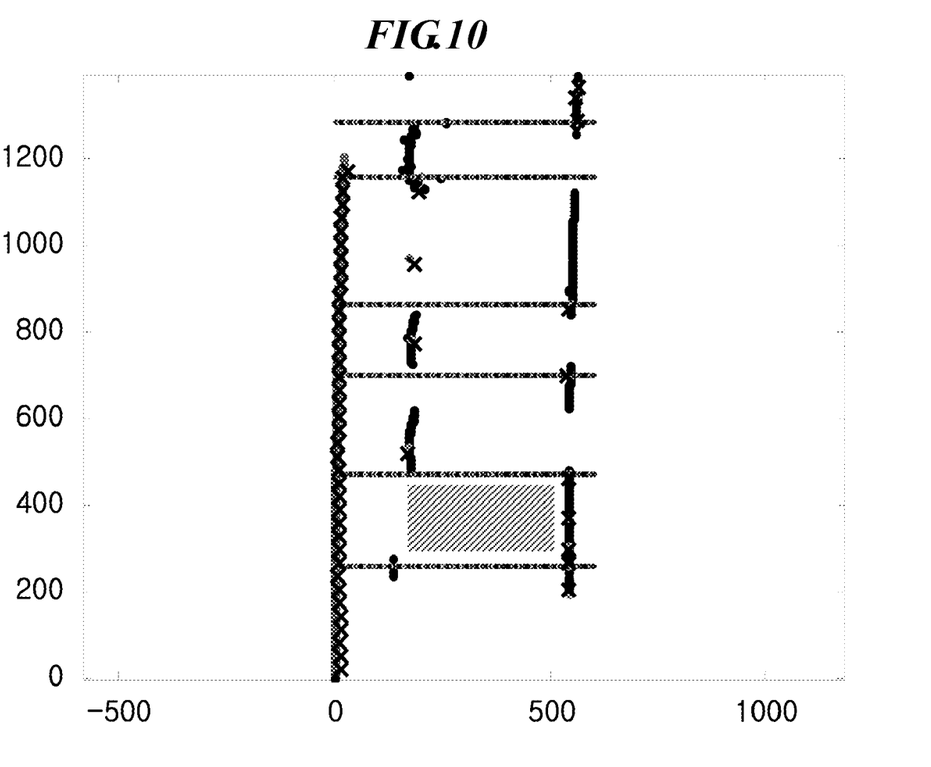
FIG. 10 shows parking space recognition result data, which is a result recognized by a parking space recognition unit included in the inventive parking space recognition system.

After analyzing and finding the position of the vehicle edge of the counterpart vehicle, the parking space recognition unit 140 can obtain parking space recognition result data 230 as shown in FIG. 10, thereby recognizing the parking space. In FIG. 10, a transverse line indicates a result of extracting the vehicle edge, an ultrasonic data-positioned area corresponds to a place where a counterpart vehicle or an obstacle is positioned, and the area indicated by slanting lines is one of recognized parking spaces.

Especially when the counterpart vehicle is perpendicularly parked, the parking space recognition system 100 in accordance with the above-mentioned embodiment recognizes the space between the counterpart vehicle and the parking space recognition system equipped vehicle as a parking space for the vehicle equipped with the parking space recognition system 100, whereby the parking space recognition system 100 can be suitably applied to perpendicularly park the parking space recognition system equipped vehicle in the recognized space.

Figure 2:
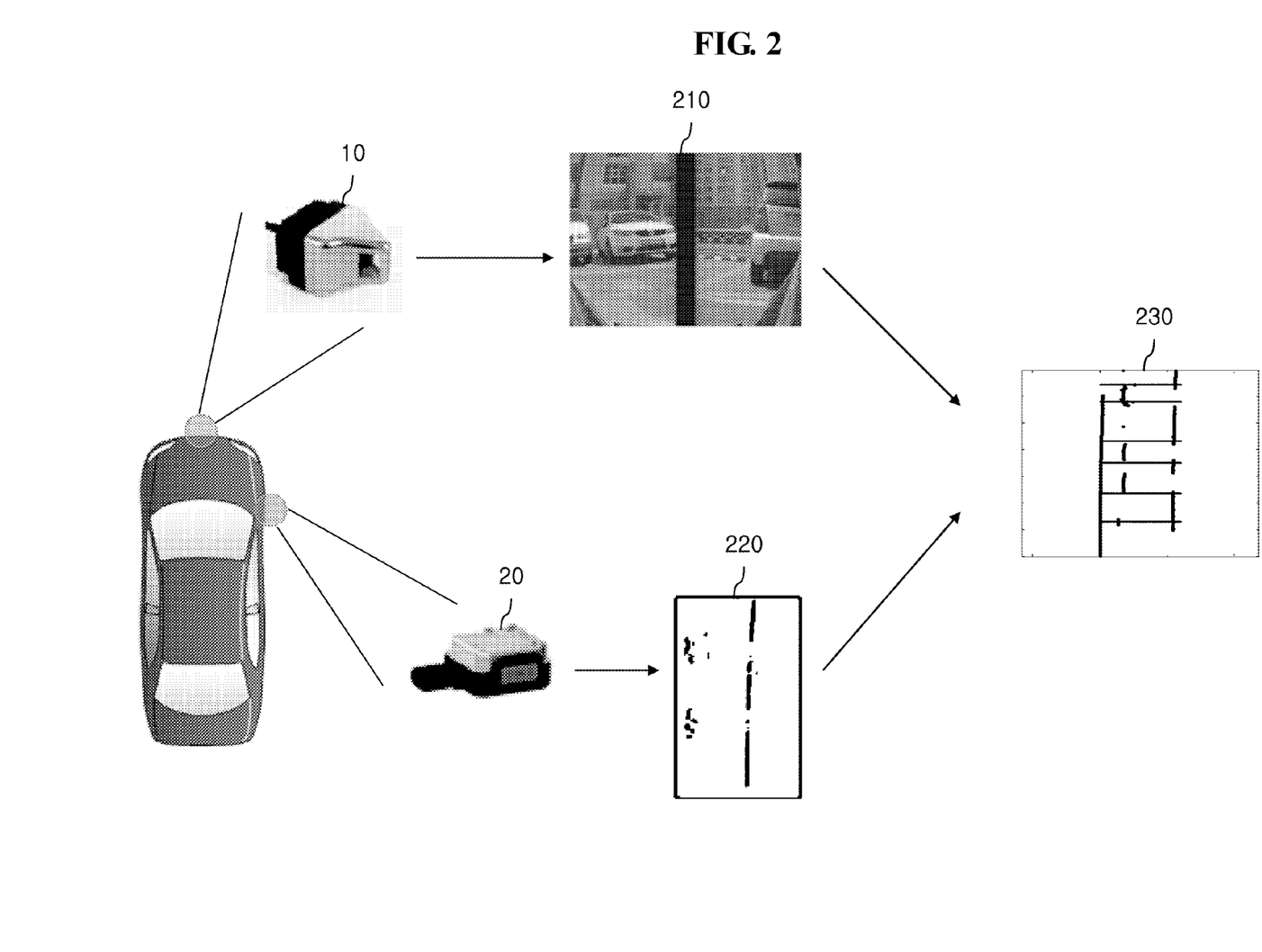
FIG. 2 is a schematic view showing a parking space recognition method in accordance with an embodiment of the present invention.

For the inventive parking space recognition system 100, it is possible to provide one or more cameras 10 and one or more ultrasonic sensors 20 at predetermined positions on the parking space recognition system equipped vehicle. For example, as shown in FIG. 2, it is possible to provide a camera 10 on the front side of the vehicle, and an ultrasonic sensor 20 on a lateral side of the vehicle. In addition, the camera 10 may be a blind spot sensing camera for acquiring an image for a blind spot which is not easily visible by the naked eyes of a driver or through a mirror.

Figure 11:
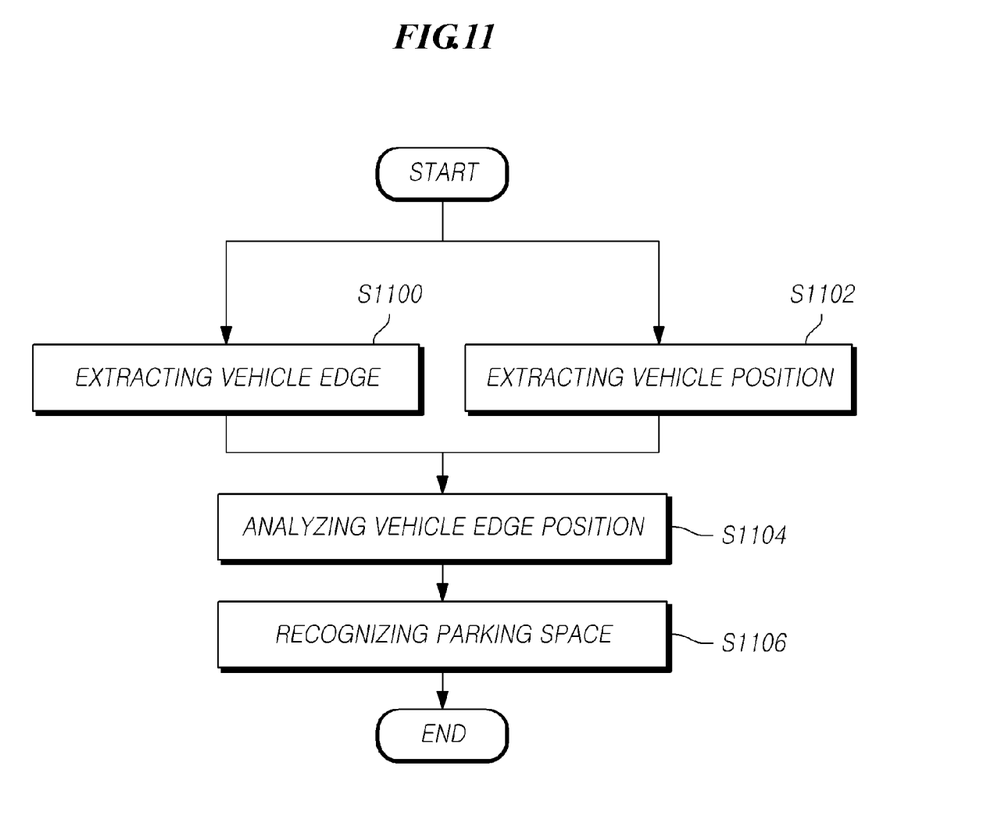
FIG. 11 is a flowchart of a parking space recognition method in accordance with an embodiment of the present invention.

FIG. 11 is a flowchart of a parking space recognition method provided by the inventive parking space recognition system 100 described above. Now, the parking space recognition method is described briefly with reference to FIG. 11.

Referring to FIG. 11, the inventive parking space recognition method includes the steps of: extracting an edge of a counterpart vehicle positioned adjacent to a parking space by analyzing an image 210 acquired by a camera 10 (S1100); extracting the position of the counterpart vehicle by analyzing ultrasonic wave data 220 acquired by an ultrasonic sensor 20 (S1102); analyzing the vehicle edge position for the extracted vehicle edge by mapping the extracted vehicle edge and the extracted vehicle position (S1104); and recognizing the parking space by determining the position of the counterpart vehicle on the basis of the analyzed vehicle edge position (S1106).

The inventive parking space recognition system provides a sensor convergence type parking space recognition method using a camera and an ultrasonic sensor in such a manner that the disadvantages of the ultrasonic sensor and the camera can be compensated with each other, thereby allowing a parking space to be more precisely recognized through the step of removing noises using a stereo matching technology.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although some preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiments. The scope of the present invention shall be construed on the basis of the accompanying claims, and all of the technical ideas equivalent to the present invention shall be construed as being included in the scope the present invention.

What is claimed is:

1. A parking space recognition system comprising:
   a vehicle edge extraction unit for extracting a vehicle edge of a counterpart vehicle positioned adjacent to a parking space by analyzing an image acquired by a camera;
   a vehicle position extraction unit for extracting a vehicle position of the counterpart vehicle by analyzing ultrasonic wave data acquired by an ultrasonic sensor;
   a vehicle edge position analysis unit for analyzing the vehicle edge position for the extracted vehicle edge by mapping the extracted vehicle edge and the extracted vehicle position; and
   a parking space recognition unit for recognizing the parking space by determining the position of the counterpart vehicle on the basis of the analyzed vehicle edge position.

2. The parking space recognition system as claimed in claim 1, wherein the vehicle edge extraction unit extracts longitudinal edges from the image, and extracts the vehicle edge of the counterpart edge by removing one or more edges corresponding to noises from the extracted longitudinal edges.

3. The parking space recognition system as claimed in claim 2, wherein the vehicle edge extraction unit calculates similarity according to edge information and similarity according to color information for the extracted longitudinal edges, and the vehicle edge extraction unit removes the edges corresponding to noises from the extracted longitudinal edges on the basis of a value obtained by multiplying the calculated similarity according to edge information and the calculated similarity according to color information.

4. The parking space recognition system as claimed in claim 3, wherein the similarity according to edge information is calculated by a function indicating whether a edge exists or not, which is varied as left image data and right image data, and the similarity according to color information is calculated on the basis of the color information of the left image and the color information of the right image.

5. The parking space recognition system as claimed in claim 1, wherein the vehicle position extraction unit converts a distance value of ultrasonic data received at a position of the parking space recognition system equipped vehicle into coordinate values so as to extract the position of the counterpart vehicle.

6. The parking space recognition system as claimed in claim 1, wherein the vehicle edge position analysis unit analyzes the vehicle edge position by generating an edge peak map consisting of edge peaks from the extracted vehicle edge, extracting a group of position candidates for the extracted vehicle edge from the edge peak map, and then mapping the position candidates for the extracted vehicle edge on the same coordinate with the extracted vehicle position.

7. The parking space recognition system as claimed in claim 1, wherein the parking space recognition system recognizes a space between the counterpart vehicle and the parking space recognition system equipped vehicle as the parking space for the parking space recognition system equipped vehicle under the circumstance in which the counterpart vehicle is parked perpendicularly, the ultrasonic sensor being provided on a lateral side of the parking space recognition system equipped vehicle, and the camera being provided on the front side of the parking space recognition system equipped vehicle.

8. A parking space recognition method comprising the steps of:

extracting a vehicle edge of a counterpart vehicle positioned adjacent to a parking space by analyzing an image acquired by a camera;

extracting a vehicle position of the counterpart vehicle by analyzing ultrasonic wave data acquired by an ultrasonic sensor;

analyzing the vehicle edge position for the extracted vehicle edge by mapping the extracted vehicle edge and the extracted vehicle position; and recognizing the parking space by determining the position of the counterpart vehicle on the basis of the analyzed vehicle edge position.

* * * * *